June 16, 1925.

T. MIDGLEY

TIRE MOLD

Filed Feb. 26, 1923

1,542,797

INVENTOR.
Thomas Midgley
BY
Edward C. Taylor
ATTORNEY.

Patented June 16, 1925.

1,542,797

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed February 26, 1923. Serial No. 621,425.

*To all whom it may concern:*

Be it known that I, THOMAS MIDGLEY, a citizen of the United States of America, residing at Hampden, in the county of Hampden and State of Massachusetts, have invented certain new and useful Improvements in Tire Molds, of which the following is a specification.

The present invention relates to improvements in molds adapted for vulcanizing rubber articles such, for example, as tire casings, and is particularly directed to the improvement of such molds in economy of operation, low cost, and lightness of weight. It finds particular utility with molds intended to be used under internal pressure.

The invention will now be described in connection with the accompanying drawings, in which—

Figure 1:
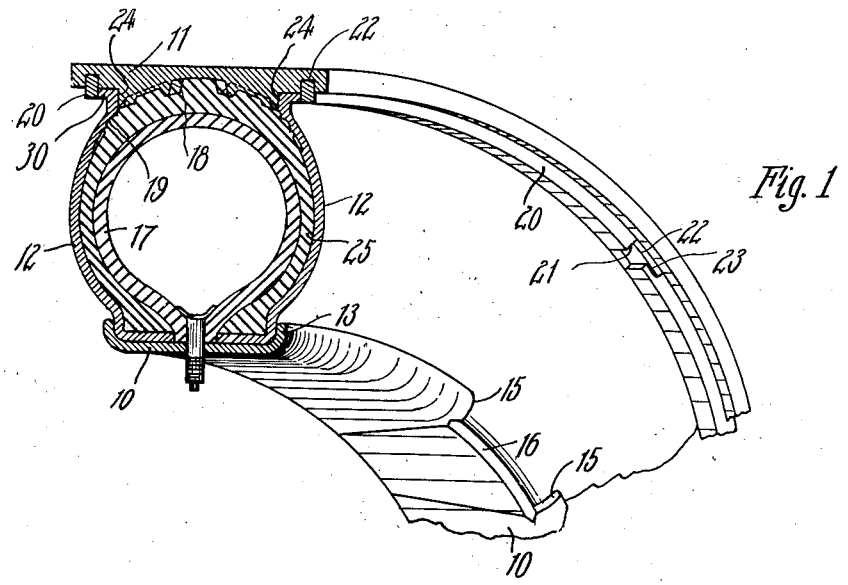
Figure 2:
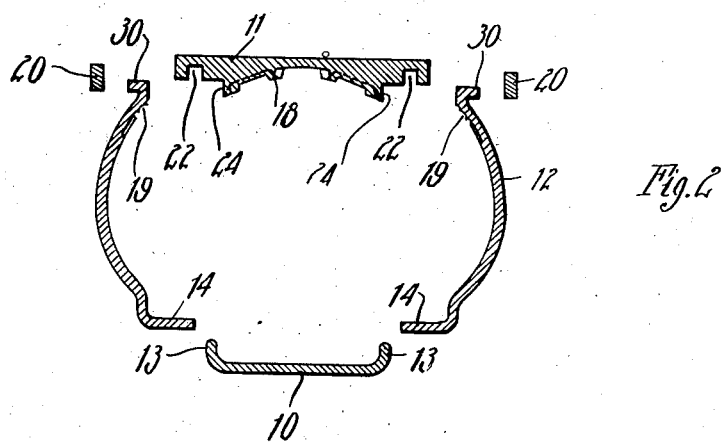

Fig. 1 is a sectional view of a mold constructed in accordance with my invention; and Fig. 2 is a sectional view thereof with the parts separated.

The molds in general use in tire manufacture are two or three part molds of cast iron, very heavy and cumbersome, and requiring much machine work. These molds are also of varying thicknesses in their different parts. The large amount of metal used in these molds wastes much heat, which is required to heat them repeatedly and temporarily to the vulcanizing temperature as successive tires are vulcanized, and the widely varying thickness of the wall, where the thickness is great already, causes variations in the degree of vulcanization imparted to various portions of the tire. This latter objection is well recognized in the trade, and numerous attempts have been made to overcome it by coring out sections of the mold and similar methods of attack. None of these attempts has, however, produced a thoroughly satisfactory mold, and I believe I am the first to produce a mold which is practically suited for the rigorous use of commercial tire manufacturing and having a greatly reduced weight with a substantially uniform wall thickless over the greater portion of its molding area.

This desirable and novel result is obtained in the mold of the present invention primarily by a departure in the design of the mold, permitting of the use of steel stampings or forgings of thickness greatly reduced in comparison with that of prior molds. Some proposals looking towards the use of steel stampings in replacing cast iron have been made, but so far as I am aware none of these molds are adaptable for use in the commercial vulcanization of tire casings.

The embodiment here illustrated is a mold having four main parts, a base ring 10, a tread ring 11, and a pair of side plates 12, cooperating with each other to form a tubular enclosure having an internal shape corresponding with the outer form to be given to the tire. The base ring 10 is shown as somewhat similar in form to a clincher rim, having flanges 13 within which the inner edges 14 of the side plates 12 are adapted to fit. In order to permit of the removal of the side plates the base ring is transversely split as at 15, the gap when the ring is expanded into operative position being closed by a wedge piece 16, conveniently dovetailed or otherwise interfitted with the ends of the base ring to make a tight and stable joint. The inner edges 14 of the side plates, as shown, are turned towards each other so as to rest upon the outer surface of the base ring, but do not quite meet each other. The space between them is utilized for the reception of the base of an annular inflatable bag 17, such as is commonly used in the vulcanization of cord tires. It will be noticed that the base of the bag is thus dropped below the bases of the tire beads, and that this is accomplished by the assembly of the sheet metal parts without any grooving or machining of the base ring. This dropping of the base is desirable in the vulcanization of cord tires for reasons which need not be gone into here, and the present mold fills the demand for a mold having this feature.

The tread ring 11 may be made of a piece of rolled or forged steel, welded or otherwise formed so as to be endless. It is not necessary to have this piece split as was the case with the base ring, since the vulcanized tire can readily be pried away from it and other provision is made for the removal of the side plates. The tread pattern which it is desired to impart to the tread portion of the tire may be formed on the tread ring in reverse as at 18 by engraving, as is commonly known in the art of making automobile tire molds, or by any other suitable method. If desired, and as here shown at 110

19, the tread pattern can be continued from the tread ring to the top portions of the side plates.

The side plates are removably held in position relative to the tread ring by snap rings 20. These snap rings are split at 21 and are adapted to spring into grooves 22 in the tread ring. One or both ends of each snap ring is provided with a recess or notch 23 by the aid of which and a screw driver or other tool the ring can be easily withdrawn from the groove.

The side plates 12 fit against a shoulder 24 on the tread ring, being firmly clamped in position between that shoulder and the snap rings when the mold is assembled. In order to bring the snap rings away from the curved sides of the side plates and facilitate their removal, the side plates are preferably provided with thickened portions 30, formed either by bending over the sheet metal of the plates themselves, or by welding a flat ring to the outer portion of the side plates.

The use of the mold is very simple. Assuming the mold to have just been used in the vulcanization of a tire 25, the wedge 16 is driven out, and the base ring collapsed sufficiently to permit it being removed from within the tire and side plates in a similar manner to that in which the ordinary split automobile rim is removed from a tire in use on the road. One or both of the snap rings 20 are then removed, thus freeing the side plates 12 for removal. The tire is now in contact only with the tread ring, and being flexible may easily be disengaged therefrom and removed, together with the bag 17. Reassembly of the mold around an unvulcanized tire is accomplished by a converse operation. The mold when assembled is entirely self contained, and may be handled freely without danger of the several mold parts becoming separated. The outer cylindrical surface of the tread ring 11 forms a convenient rest for the mold in transportation or storing, and, the mold being symmetrical and therefore laterally balanced, this surface permits the mold to be rolled along, avoiding the usual lifting and trucking.

Many of the advantages offered by this construction have been set forth above. With particular reference to the question of lightness it has been found from actual measurement that a mold of the standard size known as 31 x 4 has a weight of 150 pounds when constructed according to this invention as against a weight of 900 pounds for one of the ordinary molds used in tire factories. Another advantage of molds constructed according to this invention lies in the provision for overflow of rubber from the tire. It is well recognized in tire manufacture that in order to mold the rubber of a tire accurately and cause it to flow into all parts of the mold pattern an excess of rubber must be provided and this excess permitted to flow out of the molding space. In the mold here illustrated this overflow takes place at the junction of the tread ring and the side plates—an ideal place, as a minimum shifting of the rubber is required and the overflow comes at a point that can be made, by a suitable design of the mold and tire, to come at the edge of the tread pattern, where it is inconspicuous and can be easily trimmed. It will be noted that instead of having a single central overflow, as in the ordinary two-piece cast iron tire mold, there are two overflow lines, thus requiring a much less movement of the rubber towards the overflow than is the case in the two piece equipment.

While I have described the illustrated mold in some detail, I wish it to be understood that on account of the broadly novel features of the invention I desire to claim it as broadly as the law and the state of the art will permit.

Having thus described my invention, I claim:

1. A mold adapted for vulcanizing tire casings comprising a transversely split base ring having upturned side flanges, means for holding the base ring in expanded position, a pair of side plates adapted to lie within the flanges of the base ring and having their edges inturned and spaced from each other when the mold is assembled so as to afford space for the base of an annular vulcanizing bag, a tread ring, and means for holding the tread ring and the side plates in assembled relation.

2. A mold for use in vulcanizing the outer casings of pneumatic tires under internal pressure having its side wall portions of a single thickness of sheet metal and its tread portion much thicker than the side portions to provide recesses for the major molding operations on the tread, means to hold the mold closed at the tread and bead portions and arranged to leave the side portions free to resist only the internal pressure during vulcanization.

3. A mold for vulcanizing the outer casings of pneumatic tires under internal pressure comprising a sheet metal side wall portion of substantially uniform thickness curved to the shape of the tire, means for holding the mold closed at its inner periphery, and a tread molding portion of greater thickness than the side wall portion and carrying a tread molding design in intaglio, the tread molding portion being attached to the side wall portion so as to prevent relative movement between them when the mold is assembled irrespective of the presence of the internal pressure.

4. A mold adapted for the vulcanization of automobile tire casings, having its sides formed of sheet metal of substantially uniform thickness and its outer periphery of greater thickness than the side walls and carrying a tread molding design in intaglio.

5. A mold adapted for vulcanizing tire casings, comprising sheet metal side plates shaped to conform to the sides of the tire; a unitary tread ring bridging the space between the side plates, said tread ring having a shoulder adapted to hold the side plates spaced, cylindrical portions adjacent the shoulders over which the side plates may be removed, and grooves for the reception of snap rings; snap rings adapted to be held in the grooves to hold the side plates and tread ring assembled; thickened portions 30 on the side plates; and a base ring having flanges carried thereby for confining the inner peripheries of the side plates.

6. A mold adapted for vulcanizing tire casings, comprising sheet metal side plates shaped to conform to the sides of the tire; a unitary tread ring bridging the space between the side plates, said tread ring having a shoulder adapted to hold the side plates spaced, cylindrical portions adjacent the shoulders over which the side plates may be removed, and grooves for the reception of snap rings; snap rings adapted to be held in the grooves to hold the side plates and tread ring assembled; and a base ring having flanges carried thereby for confining the inner peripheries of the side plates.

7. A mold adapted for vulcanizing tire casings, comprising a pair of sheet metal side plates formed to the contour of the tire and having inturned portions adapted to underlie completely the beads of the tire and to afford space between them for the base of an annular vulcanizing bag, and a ring bridging the gap between the inturned side portions of the side plates, the side plates being coupled together so that a complete molding cavity is formed.

8. A mold adapted for vulcanizing casings, comprising a tread ring presenting a cylindrical outer surface, side plates, and means for coupling the side plates together at their inner circumferences and to the tread ring so that a complete molding cavity is formed, the entire mold being balanced laterally so that it may be rolled about on the outer cylindrical surface of the tread ring.

THOMAS MIDGLEY.